United States Patent
Akoubians et al.

(10) Patent No.: US 9,122,081 B2
(45) Date of Patent: Sep. 1, 2015

(54) EYEWEAR FRAME ORNAMENTATION

(71) Applicants: Mariana Akoubians, Glendale, CA (US); Grigoris Manssourian, Glendale, CA (US)

(72) Inventors: Mariana Akoubians, Glendale, CA (US); Grigoris Manssourian, Glendale, CA (US)

(73) Assignee: Mariana Akoubians, Glendale, CA (US)

( * ) Notice: Subject to any disclaimer, the term of this patent is extended or adjusted under 35 U.S.C. 154(b) by 0 days.

(21) Appl. No.: 14/017,218

(22) Filed: Sep. 3, 2013

(65) Prior Publication Data
US 2015/0062527 A1    Mar. 5, 2015

(51) Int. Cl.
*G02C 11/02*    (2006.01)

(52) U.S. Cl.
CPC ...................... *G02C 11/02* (2013.01)

(58) Field of Classification Search
CPC ..... G02C 11/00; G02C 11/02; G02C 2200/20
USPC ...................................... 351/51, 52
See application file for complete search history.

(56) References Cited

U.S. PATENT DOCUMENTS

| | | |
|---|---|---|
| 2,778,136 A | 1/1957 | Belgard |
| 4,608,838 A | 9/1986 | Gardner |
| 4,968,128 A | 11/1990 | Mendola |
| 5,195,336 A | 3/1993 | Mershon |
| 5,321,442 A | 6/1994 | Albanese |
| 5,652,637 A | 7/1997 | Marini |
| 6,582,075 B1 | 6/2003 | Swab et al. |
| 6,898,950 B2 | 5/2005 | Masina et al. |
| 7,341,342 B2 | 3/2008 | Jain |
| 7,524,052 B2 | 4/2009 | Esses |
| 7,914,143 B2 | 3/2011 | Heim |
| 2012/0113381 A1* | 5/2012 | Jacquier et al. ................. 351/51 |
| 2012/0297827 A1 | 11/2012 | Mellinger et al. |
| 2013/0003013 A1 | 1/2013 | Collins et al. |
| 2013/0160491 A1 | 6/2013 | Hedrick |

FOREIGN PATENT DOCUMENTS

FR    1579956    * 8/1969    ............. G02C 11/00

OTHER PUBLICATIONS

WO/2007/022632 ; Pub Date: Mar. 1, 2007.

* cited by examiner

*Primary Examiner* — Huy K Mai
(74) *Attorney, Agent, or Firm* — Patent Law Agency, LLC; Peter Ganjian

(57) ABSTRACT

The present invention discloses an eyewear frame ornamentation assembly that includes a retaining coupler in a form of a resilient member that detachably couples onto a frame.

20 Claims, 10 Drawing Sheets

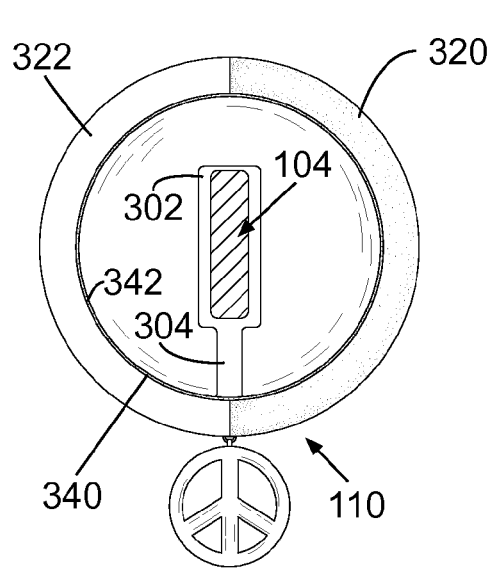
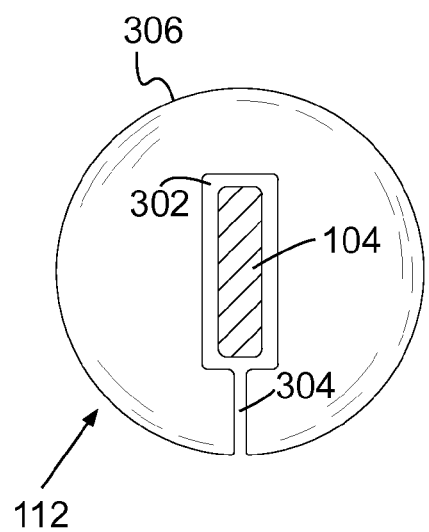
FIG. 3A
FIG. 3B
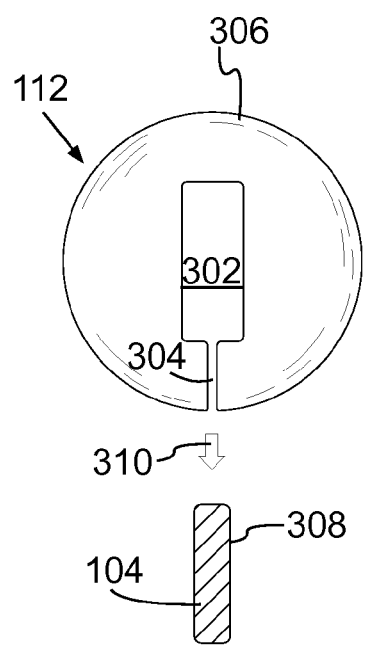
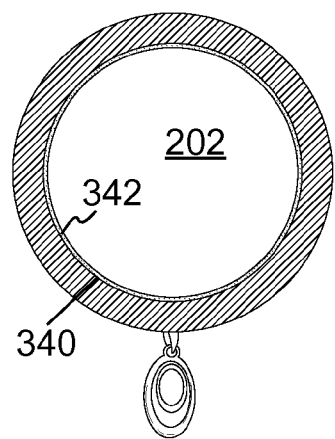
FIG. 3C
FIG. 3D

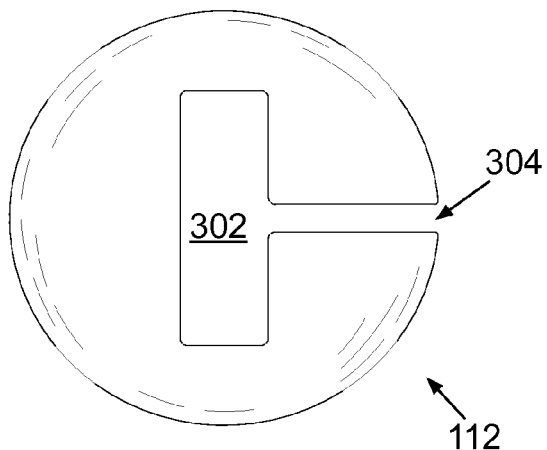
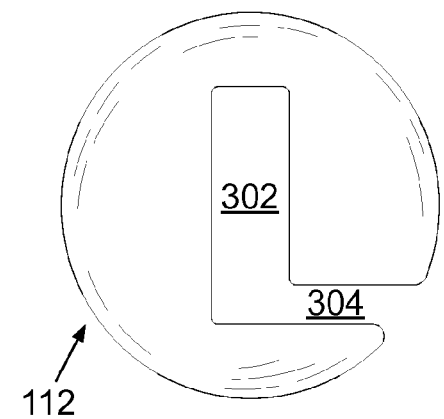
FIG. 5A  FIG. 5B
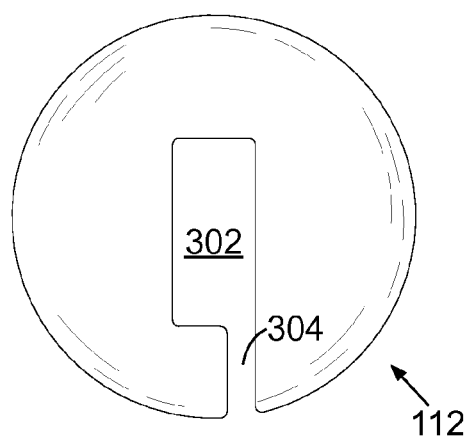
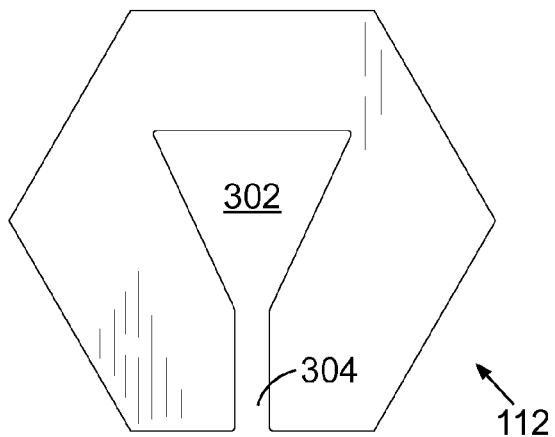
FIG. 5C  FIG. 5D

EYEWEAR FRAME ORNAMENTATION

BACKGROUND OF THE INVENTION

1. Field of the Invention

One or more embodiments of the present invention relate to interchangeable ornaments such as charms used in combination with an eyewear frame and, more particularly, to an inconspicuous removable retaining coupler for detachably securing or mounting interchangeable ornaments onto an eyewear frame without modifying the eyewear frame.

2. Description of Related Art

The use of and the need for ornaments or charms to enhance the esthetics and value of eyewear frames have long been recognized. Most conventional eyewear frame ornaments are manufactured as a single piece unit with a conspicuously integral attachment mechanism. That is, most conventional eyewear frame ornaments or charms integrally include a conspicuous attachment mechanism, forming a single piece unit that enables the ornaments to be detachably affixed onto an eyewear frame. Unfortunately, this limits the number of charms or ornamentations that may be used with an eyewear to only those that integrally include the attachment mechanism. Further, the conspicuous nature of the attachment mechanism itself takes away from the esthetics of the charm or ornamentation.

Accordingly, in light of the current state of the art and the drawbacks to current ornamentations for eyewear frames mentioned above, a need exists for an inconspicuous attachment mechanism for an eyewear frame that would allow detachable interchangeable mounting of most types of conventional ornamentations that do not integrally include an attachment mechanism and without modifying the eyewear frame.

BRIEF SUMMARY OF THE INVENTION

A non-limiting, exemplary aspect of an embodiment of the present invention provides an eyewear frame ornamentation assembly, comprising:

a retaining coupler in a form of a resilient member that detachably couples onto a frame;

the retaining coupler has sufficient bulk to frictionally retain and hold a detachably mounted ornament; and with the ornament covering the retaining coupler so that the retaining coupler is substantially inconspicuous.

Another non-limiting, exemplary aspect of an embodiment of the present invention provides an ornament, comprising:

a single piece resilient member that detachably couples onto a frame;

the resilient member includes a relief with an opening that enables the resilient member to mount onto the frame through the opening, which leads the frame into the relief of the resilient member;

the opening is an elongated, narrow cut in a form of a slit.

Another non-limiting, exemplary aspect of an embodiment of the present invention provides a method for securing ornamentation onto a frame of an eyewear, comprising:

pressing a retaining coupler onto a frame so that the frame is detachably inserted and passed through an opening and secured within a relief of the retaining coupler; and sliding an ornament onto the frame, and then onto the retaining coupler in a desired orientation;

with the ornament frictionally and detachably secured onto the retaining coupler as a result of the resiliency of the retaining coupler.

Such stated advantages of the invention are only examples and should not be construed as limiting the present invention. These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" may be used to mean "serving as an example, instance, or illustration," but the absence of the term "exemplary" does not denote a limiting embodiment. Any embodiment described as "exemplary" is not necessarily to be construed as preferred or advantageous over other embodiments. In the drawings, like reference character(s) present corresponding part(s) throughout.

FIG. 3A is a non-limiting, exemplary sectional view illustration of an assembled eyewear frame ornament that is shown in FIG. 2E in accordance with one or more embodiments of the present invention, FIG. 3B illustrates the same, but with the ornament removed, FIG. 3C illustrates the same as that shown in FIG. 3B, but with the retaining coupler detached from the frame, and FIG. 3D is a sectional view illustration of a charm that is shown in FIG. 2C in accordance with one or more embodiments;

FIGS. 5A to 5D, are non-limiting exemplary profile illustrations for different types of retaining couplers with various exemplary opening and relief orientations in accordance with one or more embodiments of the present invention.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Unless otherwise noted and distinguished specifically, throughout the disclosure (including claims), the use of specific terms such as eyewear, eyeglass, glass, sunglass, spectacle, etc. should be interpreted as synonymous and as interchangeable, all of which include a frame.

In the description given below and the corresponding set of drawing figures, when it is necessary to distinguish the various members, elements, sections/portions, components, or any other aspects (functional or otherwise) or features of a device(s) or method(s) from each other, the description and the corresponding drawing figures may follow reference numbers with a small alphabet character such as (for example) "eyewear frame charms 102a, 102b, 102c, 102d, and etc." If the description is common to all of the various members, elements, sections/portions, components, or any other aspects (functional or otherwise) or features of a device(s) or method(s) such as (for example) to all eyewear frame charms 102a, 102b, 102c, 102d, etc., then they may simply be referred to with reference number only and with no alphabet character such as (for example) "eyewear frame charm 102."

Figure 1A:
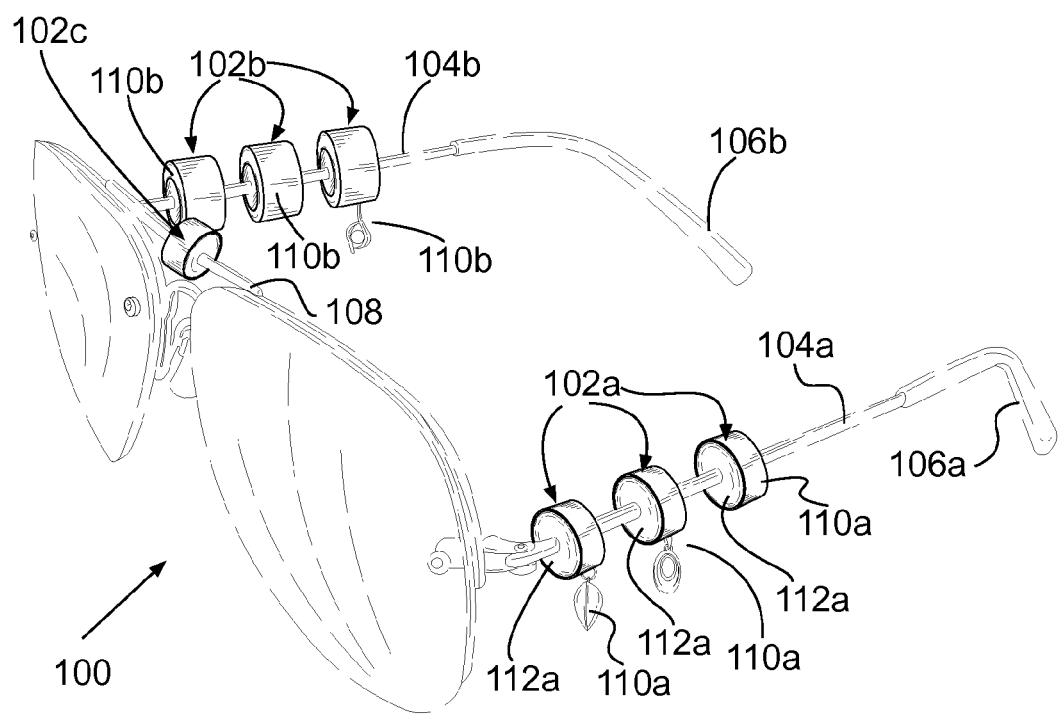
FIGS. 1A and 1B are non-limiting, exemplary illustrations of various views of one or more ornamentations mounted on an eyewear frame in accordance with one or more embodiment of the present invention.
Figure 1B:
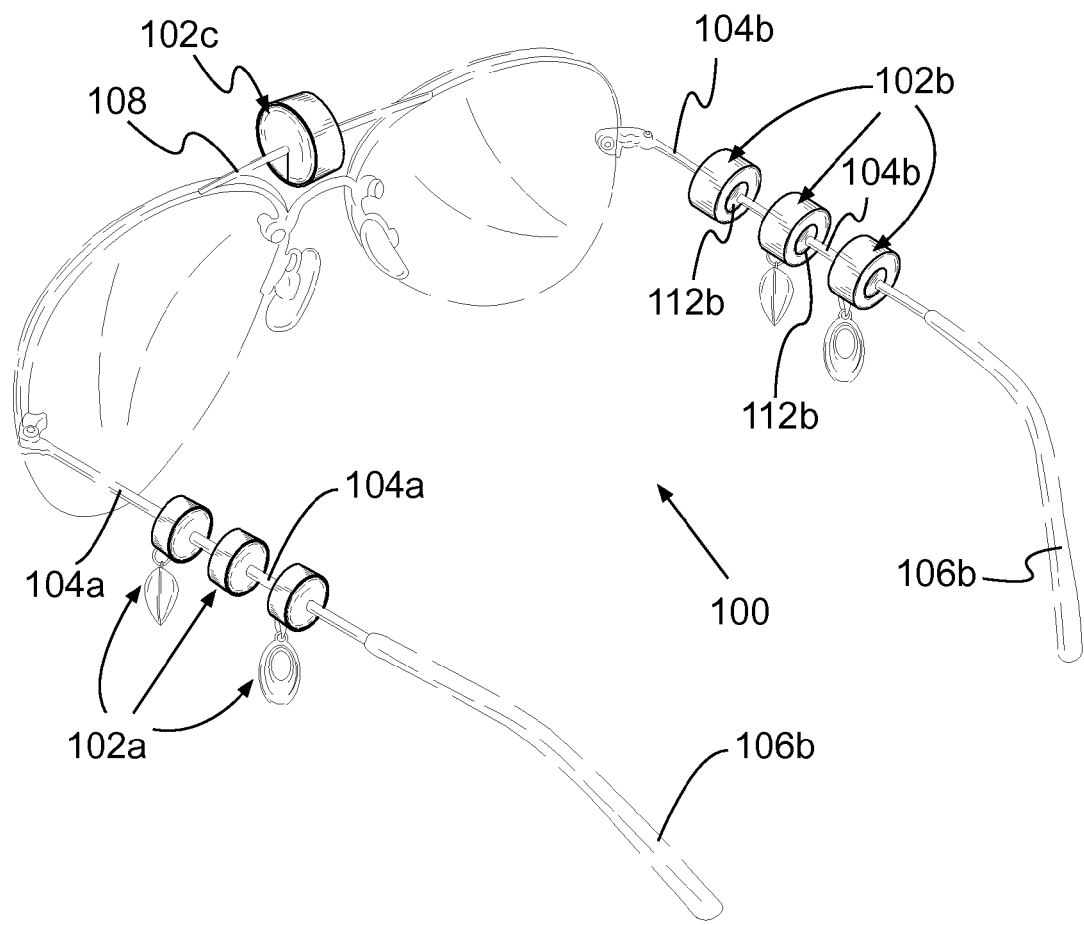

FIGS. 1A and 1B are non-limiting, exemplary illustrations of various views of one or more ornamentations mounted on an eyewear frame in accordance with one or more embodiment of the present invention. As illustrated, one or more embodiments of the present invention provide inconspicuous retaining couplers 112 to detachably and interchangeably mount most types of ornamentations or charms 110 onto an eyewear frame 100 without requiring an integral attachment mechanism and without modifying the eyewear frame 100, forming the illustrated assembly of eyewear frame charms 102 for an existing eyewear frame 100.

The assembled eyewear frame charms 102 may be detachably mounted on the temples 104 and or the top bar 108 of an eyewear frame 100 with no modifications to the frame 100, with the assembled eyewear frame charms 102a playfully sliding back and forth along the temple 104a when the frame 100 is moved or tilted, while the assembled eyewear frame charms 102b remain frictionally stationary on the temple 104b. The assembled eyewear frame charms 102b may use material (a non-limiting example of which may be a soft rubber) as the retaining coupler 112b with a smaller relief to frictionally remain in the mounted position along the illustrated temple 104b. FIGS. 1A and 1B also illustrate a retaining coupler that itself is an eyewear frame charm 102c that is coupled to the top bar 108. In other words, the retaining coupler 112c is the ornament that is mounted on the top bar 108 of the frame 100 as the eyewear frame charm 102c, without requiring additional or a separate ornament 110.

The number and types of assembled eyewear frame charms 102 that may be mounted onto the eyewear frame 100 may be varied, depending on the size of the frame 100. As detailed below, the retaining coupler 112 has sufficient bulk to frictionally retain and hold different types of detachably mounted ornamentation 110 to form the assembled eyewear frame charm 102. As illustrated in FIGS. 1A and 1B, the retaining coupler 112 is substantially or completely inconspicuous (depending on the size or type of the ornament 110 used) when the ornament 110 is detachably mounted onto and covers over the retaining coupler 112, making the eyewear frame charms 102 and the resulting eyewear frame combination esthetically pleasing.

Figure 2A:
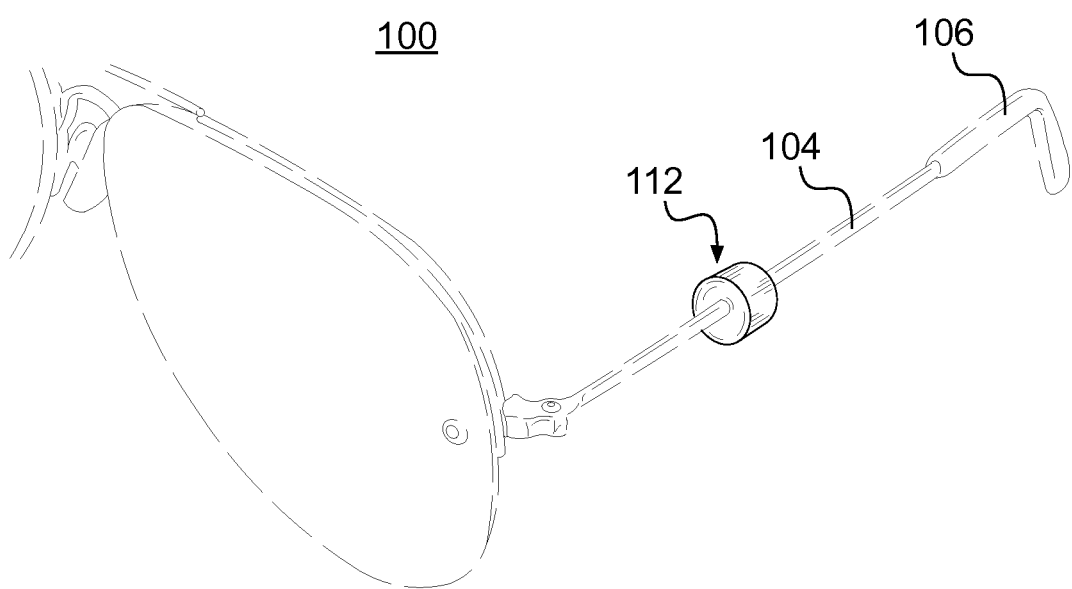
FIGS. 2A to 2E are non-limiting, exemplary illustrations that progressively illustrate an assembly of eyewear frame charm onto an eyewear frame in accordance with one or more embodiments of the present invention.
Figure 2B:
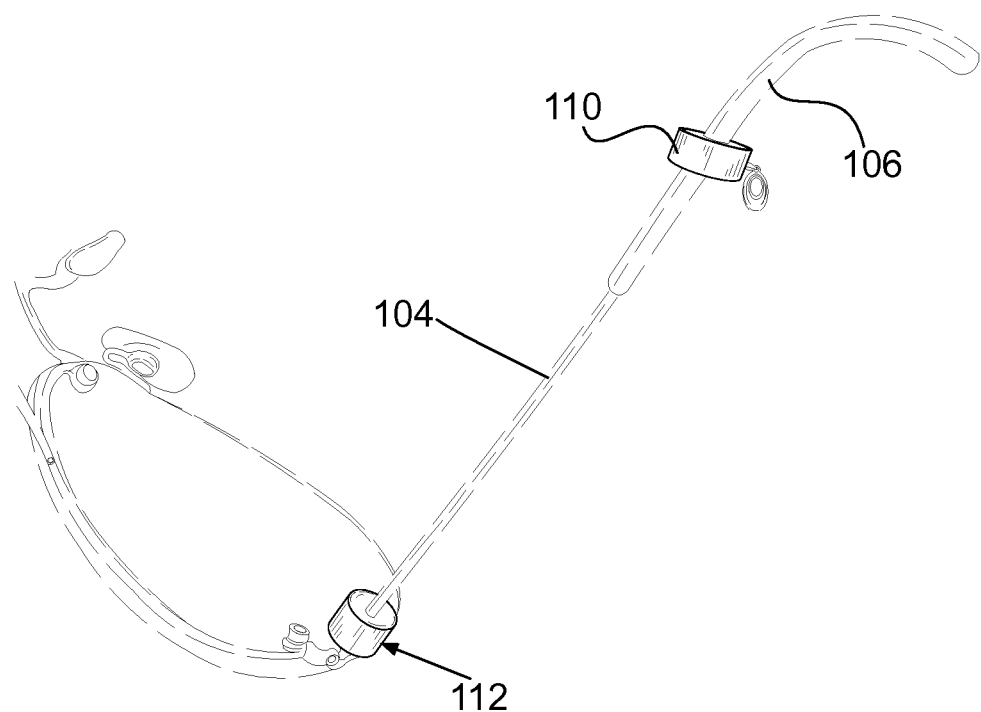

FIGS. 2A to 2E are non-limiting, exemplary illustrations that progressively illustrate the assembly of eyewear frame charms 102 onto an eyewear frame in accordance with the present invention, with FIG. 2A exemplarily illustrating an already coupled retaining coupler 112. As illustrated in FIGS. 1A to 2E, the assembled eyewear frame charms 102 are generally comprised of the retaining coupler 112 that is comprised of single piece resilient member that is detachably coupled with the frame 100 as shown in FIG. 2A. As indicated above, the resilient member itself may be made to be decorative and ornamental, thus constituting the eyewear frame charm 102c and hence, not requiring additionally mounted ornament.

Figure 4:
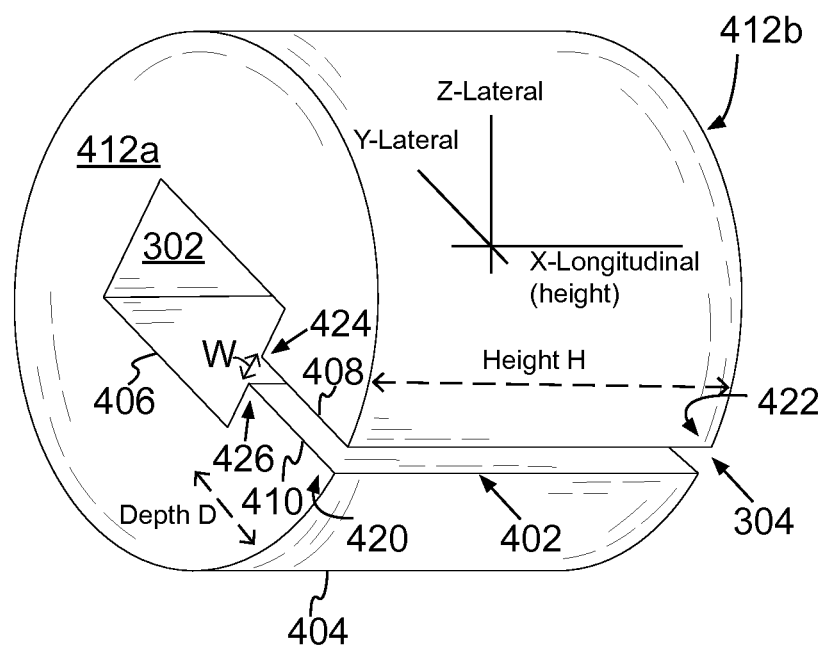
FIG. 4 is a non-limiting, exemplary illustration of an enlarged, exemplary retaining coupler in accordance with one or more embodiments of the present invention.

The retaining coupler 112 (decorative or ornamental or not, the details of which is provided in relation to FIGS. 3A to 4) is first mounted (detachably snap-fit installed) onto a desired part of the frame 100 as shown in FIG. 2A. The details of the mounting process of the retaining coupler 112 are provided below in relation to FIGS. 3A to 4. Referring to FIG. 2A, in the instance illustrated, the retaining coupler 112 is detachably installed ("snap-fit") onto a temple 104 of the frame 100. After installing the retaining coupler 112 onto a desired part of the frame 100 (in this non-limiting instance, the temple 104), as progressively illustrated in FIGS. 2B to 2E, the ear piece 106 of the frame 100, and then the temple 104 of the frame 100 are slid through a through-opening 202 of the ornament 110, bringing the ornament 110 in contact with the retaining coupler 112 (best illustrated in FIG. 2D). It should be noted that the ornament 110 should have a through-opening 202 of greater cross-sectional profile than the outer perimeter of the frame part (e.g., temple 104) or the retaining coupler 112. Further (and as detailed below in relation to FIG. 3A), although optional, the ornament 110 may further include a soft rubber or other material inner lining for added friction along the inner side (that forms the through-hole) that contacts the retaining coupler 112. No ornament or decorative charm 110 would be required if the retaining coupler used is ornamental or decorative, constituting the eyewear frame charm 102c.

In general, the outer perimeter of the retaining coupler 112 should be sufficiently large to permit mounting of the ornament 110 over the retaining coupler 112 by exertion of a reasonable force so that the ornament 110 is frictionally secured onto the retaining coupler 112 as a result of the resiliency of the retaining coupler 112. That is, as the ornament 110 is pushed or pressed to forcefully slide over the retaining coupler 112, the applied force compresses the flexible, resilient retaining coupler 112, allowing the ornament 110 to be mounted thereon. The tight fit of the ornament 110 onto the retaining coupler 112 continuously compresses the retaining couple 112, with the retaining coupler 112 continuously countering the compressive forces from the ornament 110 due to its resiliency so to expand to its original form, which results in tight frictional hold of the ornament 110 as best illustrated in FIG. 2E.

Figure 2C:
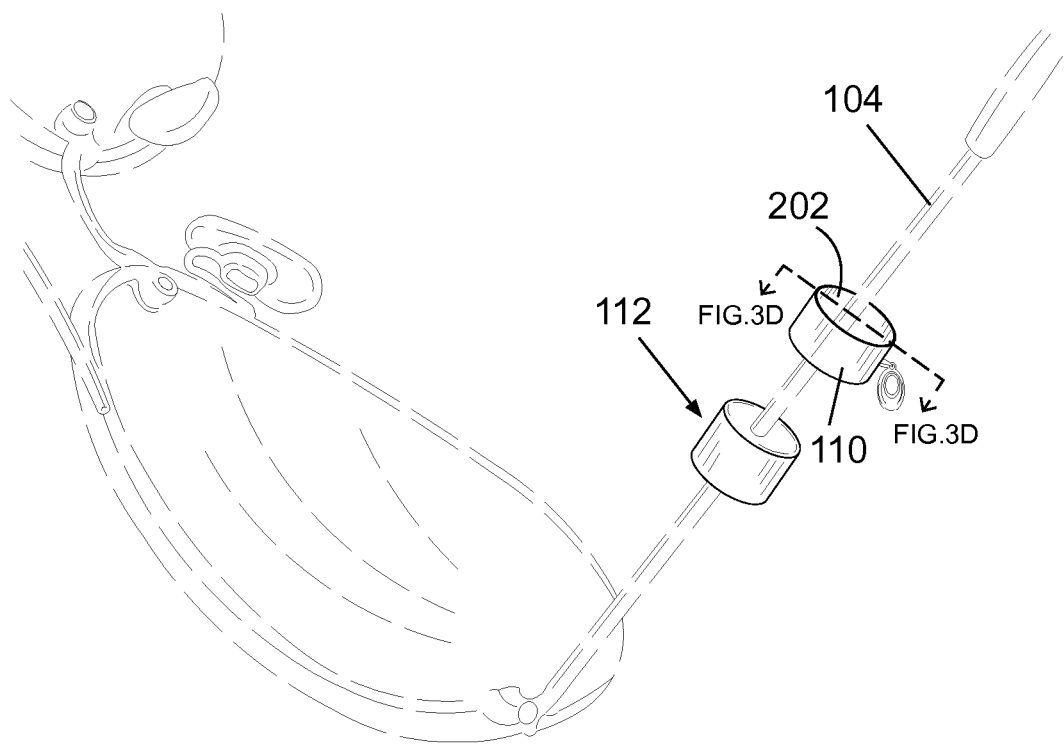
Figure 2D:
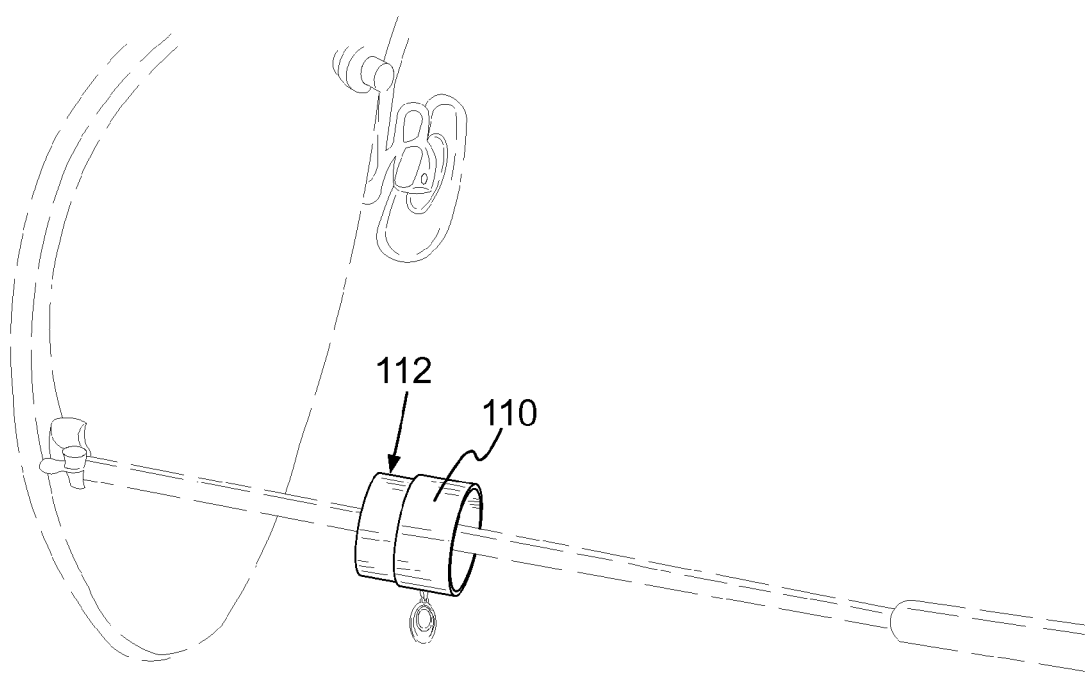
Figure 2E:
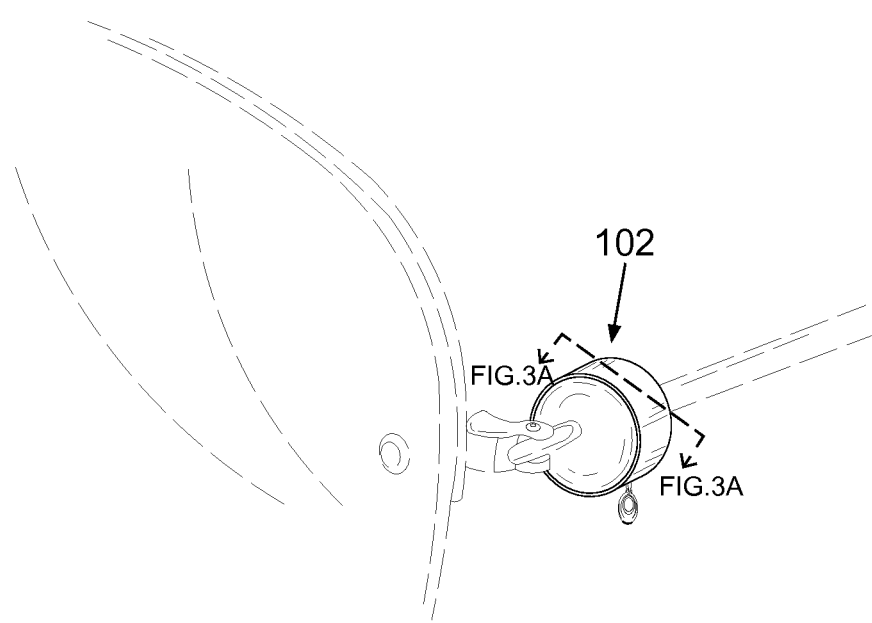

FIG. 3A is a non-limiting, exemplary sectional view illustration of an assembled eyewear frame ornament that is shown in FIG. 2E in accordance with one or more embodiments of the present invention, FIG. 3B illustrates the same, but with the ornament removed, FIG. 3C illustrates the same as that shown in FIG. 3B, but with the retaining coupler detached from the frame, and FIG. 3D is a sectional view illustration of a charm that is shown in FIG. 2C in accordance with one or more embodiments. As illustrated in FIGS. 3A to 3D, the assembled eyewear frame ornament 102 include the retaining coupler 112 that is mounted onto a frame part, with the ornament 110 mounted onto the retaining coupler 112. The retaining coupler 112 includes a relief 302 with an opening 304. That is, the retaining coupler 112 is mounted onto a frame part of a frame 100 through the opening 304 that leads the frame part into the relief 302. As shown by the arrow 310 (FIG. 3C), the opening 304 allows for a forced installation insertion and forced removal of the retaining coupler 112 so that the retaining coupler 112 detachably snaps onto a frame part.

The relief 302 is comprised of a through opening of sufficiently greater cross-sectional profile than an outer perimeter 308 of the frame part, the greater cross-sectional profile of the relief 302 being sufficiently large to completely accommodate the frame part within the relief 302. For the retaining couplers 112a, the size of the cross-sectional profile of the relief 302 is intentionally made larger than the size of the cross-sectional profile of the frame part so to enable the retaining couplers 112a (and the assembled eyewear frame charms 102a) to playfully slide back and forth along the frame part when the frame 100 is moved or tilted.

As further illustrated, the ornament 110 has a through opening 202 of greater cross-sectional profile than the outer perimeter 306 of the retaining coupler 112, the outer perimeter 306 of the retaining coupler 112 being sufficiently large to permit press mounting of the ornament 110 over the retaining coupler 112, with the ornament 110 frictionally secured onto the retaining coupler 112 as a result of the resiliency of the retaining coupler 112. It should be noted that the ornament 110 can be mounted onto the retaining coupler 112 in any orientation. For example, if the ornament 110 is a bi-color cylindrical piece (as shown in FIG. 3A) that has a pink color side 320 and a gray color side 322, the user may mount the ornament 110 so that the pink color side 320 is showing away from the face, and re-install the same ornament 110 where the gray color side 322 is viewable. Further, as indicated above and best shown in FIG. 3D, although optional, the ornament 110 may further include a soft rubber or other material inner lining 342 for added friction along the inner side 340 (that forms the through-hole 202) that contacts the retaining coupler 112.

FIG. 4 is a non-limiting, exemplary illustration of an enlarged exemplary retaining coupler in accordance with one or more embodiments of the present invention. Referring to FIGS. 3A to 4, the opening 304 of the retaining coupler 112 is an elongated, narrow cut in a form of a slit. The illustrated slit 304 need not be a straight, linear cut and may meander along the height (the longitudinal axis) of the retaining coupler 112. The side edges 420 and 422 of the exterior periphery 402 of the opening 304 may include chamfered edges for ease of insertion or mounting of the retaining coupler 112 onto a frame 100. The chamfered edges may comprise of inwardly extending tapered edges (inwardly towards the relief 302) at 420 and 422 where the gap or width W between the edges 420 and 422 of the exterior side 402 of opening sides 408 and 410 of the opening 304 is wider (than the remaining gap or span of the opening (towards the relief 302) at 424 and 426. It should be noted that the retaining coupler 112 may be mounted at any location or position along the longitudinal length of the frame part limited by the relief size.

The opening 304 has a length that is elongated, extending along an entire height H of the retaining coupler 112. The opening 304 further has a depth D that extends from an exterior outer surface 404 of the retaining coupler 112 and ends at a relief edge 406. The opening has a width W that is substantially narrow, enabling the retaining coupler 112 to resiliently snap onto the frame 100. As further illustrated, the relief 302 is a through-hole, extending the entire height H of the retainer coupler 112. The opening width W is resiliently widened when the frame part is inserted through the opening 304 by exertion of a force, generating compressive and tensile forces experienced by the retaining coupler 112, where the opening sides 408 and 410 are moved to widen the gap or width W to allow insertion of the frame part. The opening 304 is resiliently returned to original width W when the frame part has passed through the opening 304 and is accommodated inside the relief 302, with the relief 302, relieving the compressive and tensile forces to allow the retaining coupler 112 to return to its original configuration, and also to prevent the frame part from moving out of the relief 302.

As indicated, the retaining coupler 112 illustrated may comprise of any shape or form, non-limiting examples of which may include having decorative or ornamental configurations, constituting an eyewear frame charm 102c, with no further requirements for an additional ornament 110. Other forms of the retaining coupler 112 may include polygonal, circular, oval, and elliptical cross-sectional profile. The relief 302 may comprise of any shape, non-limiting examples of which may include a substantially circular, oval, elliptical, or a polygonal cross-sectional profile. Further, the lateral sides 412a and 412b may be tapered inwardly (concaved) or outwardly (convex).

FIGS. 5A to 5D are non-limiting exemplary profile illustrations for different types of retaining couplers with various exemplary opening and relief orientations in accordance with one or more embodiments of the present invention. As illustrated in FIGS. 5A to 5D, the opening 304 need not directly lead into the relief 302. Further, the relief 302 need not be positioned axially, that is, the relief 302 need not be positioned or oriented along the central longitudinal axis of the retaining coupler 112 and may be eccentrically positioned (off center) in relation to the rest of the body of the retaining coupler 112.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. For example, the periphery edges of the lateral sides 412a and 412b of the retaining coupler 112 may include flanges forming a shape similar to a spool. Any marginally rigid material with resiliency, non-limiting examples of which may include plastics, polyurethane, rubber, polylactide (PLA), Acrylonitrile Butadiene Styrene (ABS), Polyvinyl chloride (PVC), or the like may be used for the retaining coupler, including flexible magnetic material. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. An eyewear frame ornamentation assembly, comprising:
a retaining coupler in a form of a resilient member that detachably couples onto a frame;
the retaining coupler has sufficient bulk to frictionally retain and hold a detachably mounted ornament; and with the ornament covering the retaining coupler so that the retaining coupler is substantially inconspicuous.

2. The eyewear frame ornamentation assembly as set forth in claim 1,
wherein:
the retaining coupler includes a relief with an opening.

3. The eyewear frame ornamentation assembly as set forth in claim 2,
wherein:
the opening is an elongated, narrow cut in a form of a slit.

4. The eyewear frame ornamentation assembly as set forth in claim 2,
wherein:
the opening allows for a forced installation insertion and forced removal of the retaining coupler so that the retaining coupler detachably snaps onto the frame.

5. The eyewear frame ornamentation assembly as set forth in claim 2,
wherein:
the opening has a length that is elongated, extending along an entire height of the retaining coupler;
the opening has a depth that extends from an exterior outer surface of the retaining coupler and ends at a relief edge;
the opening has a width that is substantially narrow, enabling the retaining coupler to resiliently snap onto the frame.

6. The eyewear frame ornamentation assembly as set forth in claim 2,
wherein:
the relief is a through-hole, extending the entire height of the retainer coupler.

7. The eyewear frame ornamentation assembly as set forth in claim 5,
wherein:
the opening width is resiliently widened when the frame is inserted through the opening by exertion, generating compressive and tensile forces experienced by the retaining coupler; and
the opening is resiliently returned to original width when the frame has passed through the opening and is accommodated inside the relief;
with the relief, relieving the compressive and tensile forces and preventing the frame from moving out of the relief.

8. The eyewear frame ornamentation assembly as set forth in claim 2,
wherein:
a size of a cross-sectional profile of the relief is larger than the size of a cross-sectional profile of the frame.

9. The eyewear frame ornamentation assembly as set forth in claim 2,
wherein:
the ornament having a through opening of greater cross-sectional profile than an outer perimeter of the retaining coupler, the greater outer perimeter of the retaining coupler being sufficiently large to permit press mounting of the ornament over the retaining coupler;
with the ornament frictionally secured onto the retaining coupler as a result of the resiliency of the retaining coupler.

10. The eyewear frame ornamentation assembly as set forth in claim 2,
wherein:
the relief is comprised of a through opening of greater cross-sectional profile than an outer perimeter of the frame, the greater cross-sectional profile of the relief being sufficiently large to permit complete passage of the retaining coupler over the frame.

11. The eyewear frame ornamentation assembly as set forth in claim 1,
wherein:
the retaining coupler is mounted onto a structure through an opening that leads the structure into a relief.

12. The eyewear frame ornamentation assembly as set forth in claim 1,
wherein:
the ornament has an inner lining of material for added friction.

13. An ornament, comprising:
a single piece resilient member that detachably couples onto a frame;
the resilient member includes a relief with an opening that enables the resilient member to mount onto the frame through the opening;
the opening is an elongated, narrow cut in a form of a slit that is eccentrically aligned in relation to a center of the relief, which leads the frame into and out of the relief at an angle in relation to the center.

14. The ornament as set forth in claim 13, wherein:
the opening allows for a forced installation insertion and forced removal of the resilient member so that the resilient member detachably snaps onto the frame.

15. The ornament as set forth in claim 13, wherein:
the opening has a length that is elongated, extending along an entire height of the resilient member;
the opening has a depth that extends from an exterior outer surface of the retaining resilient member and ends at a relief edge;
the opening has a width that is substantially narrow, enabling the resilient member to resiliently snap onto a structure.

16. The ornament as set forth in claim 13, wherein:
the relief is a through-hole, extending the entire height of the resilient member.

17. The as set forth in claim 13, wherein:
an opening width of the opening is resiliently widened when the frame is inserted through the opening by exertion, generating compressive and tensile forces experienced by the retaining coupler; and
the opening is resiliently returned to original width when the frame has passed through the opening and is accommodated inside the relief;
with the relief, relieving the compressive and tensile forces and preventing the frame from moving out of the relief.

18. The ornament as set forth in claim 13, wherein:
a size of a cross-sectional profile of the relief is larger than a size of a cross-sectional profile of the frame.

19. The ornament as set forth in claim 13, wherein:
the relief is comprised of a through opening of greater cross-sectional profile than an outer perimeter of the frame, the greater cross-sectional profile of the relief being sufficiently large to permit complete passage of the resilient member over the frame.

20. A method for securing ornamentation onto a frame of an eyewear,
comprising:
pressing a retaining coupler onto a frame so that the frame is detachably inserted and passed through an opening and secured within a relief of the retaining coupler; and
sliding an ornament onto the frame, and then onto the retaining coupler in a desired orientation;
with the ornament frictionally and detachably secured onto the retaining coupler as a result of the resiliency of the retaining coupler.

* * * * *